US011743797B1

(12) United States Patent
Moshayedi

(10) Patent No.: US 11,743,797 B1
(45) Date of Patent: Aug. 29, 2023

(54) ANALOG AND DIGITAL COMMUNICATION SYSTEM FOR INTERFACING PLAIN OLD TELEPHONE SERVICE DEVICES WITH A NETWORK

(71) Applicant: Granite Telecommunications, LLC, Quincy, MA (US)

(72) Inventor: Kevan Moshayedi, Irvine, CA (US)

(73) Assignee: Granite Telecommunications, LLC, Quincy, MA (US)

( * ) Notice: Subject to any disclaimer, the term of this patent is extended or adjusted under 35 U.S.C. 154(b) by 0 days.

(21) Appl. No.: 17/231,837

(22) Filed: Apr. 15, 2021

Related U.S. Application Data

(63) Continuation of application No. 17/033,607, filed on Sep. 25, 2020, now Pat. No. 10,986,555.

(60) Provisional application No. 62/905,710, filed on Sep. 25, 2019.

(51) Int. Cl.
| | |
|---|---|
| *H04W 36/30* | (2009.01) |
| *H04L 12/28* | (2006.01) |
| *H04W 8/18* | (2009.01) |
| *H04W 12/033* | (2021.01) |

(52) U.S. Cl.
CPC ......... *H04W 36/30* (2013.01); *H04L 12/2881* (2013.01); *H04L 12/2889* (2013.01); *H04L 12/2898* (2013.01); *H04W 8/183* (2013.01); *H04W 12/033* (2021.01)

(58) Field of Classification Search
CPC .... G08B 27/005; G08B 25/08; G08B 25/085; G08B 25/10; H04M 1/2535; H04M 1/72519; H04M 11/062; H04W 36/30; H04W 12/0013; H04Q 3/0045
See application file for complete search history.

(56) References Cited

U.S. PATENT DOCUMENTS

| | | | | |
|---|---|---|---|---|
| 6,567,769 | B2 * | 5/2003 | Chang | ................... G06Q 20/105 |
| | | | | 705/41 |
| 7,492,755 | B2 | 2/2009 | Cabana | |
| 7,522,722 | B2 | 4/2009 | Fischer et al. | |

(Continued)

FOREIGN PATENT DOCUMENTS

| | | |
|---|---|---|
| CN | 204272165 | 4/2015 |
| CN | 205265927 | 5/2016 |
| EP | 3185527 | 2/2019 |

*Primary Examiner* — Jenee Holland
(74) *Attorney, Agent, or Firm* — Hamilton, Brook, Smith & Reynolds, P.C.

(57) ABSTRACT

An analog and digital communication system establishes a connection between a plain old telephone service (POTS) device and a destination device. The system includes a customer appliance that includes multiple ports, an internal power source device, a subscriber identification module (SIM) card, an electronic control unit, an analog to digital convertor, and a processor device. At least one of the ports are operably connected to the POTS device. A controller communicates remotely with the customer appliance via the network to provide routing of the telephone call between the POTS device and the destination device. The controller is configured to at least one of transmit the telephone call or receive the telephone call via a closest public switched telephone network (PSTN) handoff or via an internal customer appliance network establishing a connection between the customer appliance and a second customer appliance.

22 Claims, 9 Drawing Sheets

(56) References Cited

U.S. PATENT DOCUMENTS

| | | | |
|---|---|---|---|
| 7,706,779 B2 | 4/2010 | Buckley | |
| 7,995,738 B1* | 8/2011 | Ward | H04Q 3/005 379/221.13 |
| 8,085,742 B2 | 12/2011 | Lazaridis | |
| 8,085,922 B1* | 12/2011 | Smith | H04M 1/2745 379/216.01 |
| 8,139,585 B1 | 3/2012 | Mangai | H04L 65/1104 370/395.2 |
| 8,781,841 B1* | 7/2014 | Wang | H04M 3/56 704/275 |
| 8,798,660 B2* | 8/2014 | Brittain | H04M 3/42357 455/445 |
| 8,855,107 B1 | 10/2014 | Kirchhoff | H04M 3/46 370/352 |
| 9,071,681 B1* | 6/2015 | Vasquez | H04M 3/567 |
| 10,986,555 B1 | 4/2021 | Moshayedi | |
| 2002/0057693 A1 | 5/2002 | Gallant | |
| 2002/0101851 A1 | 8/2002 | Blake | |
| 2002/0114274 A1 | 8/2002 | Sturges | |
| 2002/0146005 A1 | 10/2002 | Gallant | |
| 2002/0167590 A1 | 11/2002 | Naidoo | |
| 2002/0188713 A1* | 12/2002 | Bloch | H04Q 3/5455 709/230 |
| 2002/0191590 A1* | 12/2002 | Niu | H04M 15/43 370/352 |
| 2003/0009463 A1 | 1/2003 | Gallant | |
| 2003/0091032 A1* | 5/2003 | Laxman | H04L 12/2856 370/352 |
| 2003/0133437 A1 | 7/2003 | Richarson | |
| 2003/0156697 A1* | 8/2003 | Svercek | H04M 3/56 379/207.02 |
| 2003/0164877 A1 | 9/2003 | Murai | |
| 2003/0198198 A1 | 10/2003 | Echavarri | |
| 2003/0224835 A1 | 12/2003 | Everett | |
| 2003/0227540 A1 | 12/2003 | Monroe | |
| 2004/0062237 A1 | 4/2004 | MacArthur | |
| 2004/0095925 A1* | 5/2004 | Cody | H04Q 3/0045 370/352 |
| 2004/0172657 A1 | 9/2004 | Phillips | |
| 2005/0073998 A1* | 4/2005 | Zhu | H04L 65/104 370/352 |
| 2005/0083844 A1* | 4/2005 | Zhu | H04L 45/04 370/230.1 |
| 2005/0160325 A1 | 7/2005 | Ogino | |
| 2005/0232243 A1* | 10/2005 | Adamczyk | H04Q 3/0045 370/352 |
| 2005/0262519 A1 | 11/2005 | Luebke | |
| 2006/0088025 A1* | 4/2006 | Barkley | H04L 65/1083 370/352 |
| 2006/0099969 A1 | 5/2006 | Staton | |
| 2006/0107296 A1 | 5/2006 | Mock | |
| 2006/0168190 A1 | 7/2006 | Johan | |
| 2006/0245350 A1* | 11/2006 | Shei | H04L 45/28 370/216 |
| 2006/0265376 A1* | 11/2006 | Tagane | H04L 67/14 707/999.009 |
| 2007/0014281 A1 | 1/2007 | Kant | |
| 2007/0043829 A1 | 2/2007 | Dua | |
| 2007/0058790 A1 | 3/2007 | Wynn | |
| 2007/0064886 A1* | 3/2007 | Chiu | H04L 65/1104 379/88.17 |
| 2007/0091833 A1* | 4/2007 | Bauchot | H04M 1/2535 455/426.2 |
| 2007/0183402 A1 | 8/2007 | Bennett | |
| 2007/0207771 A1 | 9/2007 | Bowser | |
| 2008/0069327 A1* | 3/2008 | Kingsley | H04M 3/42153 379/201.03 |
| 2008/0095144 A1* | 4/2008 | Goldberg | H04L 12/66 370/352 |
| 2008/0133580 A1* | 6/2008 | Wanless | H04L 61/4594 707/999.102 |
| 2008/0159744 A1 | 7/2008 | Soto | |
| 2008/0259886 A1 | 10/2008 | Svarre | |
| 2008/0298346 A1 | 12/2008 | Chan | |
| 2008/0304825 A1 | 12/2008 | Mahony | |
| 2008/0317225 A1 | 12/2008 | Cotignola | |
| 2009/0022283 A1* | 1/2009 | Pollitt | H04M 7/006 379/87 |
| 2009/0298521 A1* | 12/2009 | Finlayson | H04L 65/1033 455/500 |
| 2009/0323904 A1 | 12/2009 | Shapiro | |
| 2010/0067684 A1 | 3/2010 | Chan | |
| 2010/0124921 A1 | 5/2010 | Carmon | |
| 2010/0226346 A1 | 9/2010 | Caldwell et al. | |
| 2011/0059741 A1* | 3/2011 | Klein | H04W 36/30 455/436 |
| 2011/0102171 A1 | 5/2011 | Raji | |
| 2011/0276421 A1* | 11/2011 | Zhu | H04M 7/0069 370/352 |
| 2012/0324566 A1 | 12/2012 | Baum | |
| 2013/0257623 A1 | 10/2013 | Bagasra | |
| 2014/0269618 A1* | 9/2014 | Surface | H04W 36/0094 370/331 |
| 2014/0280991 A1* | 9/2014 | Lederman | H04L 67/306 709/228 |
| 2015/0109104 A1 | 4/2015 | Fadell | |
| 2016/0148476 A1 | 5/2016 | Wakeyama | |
| 2016/0191713 A1 | 6/2016 | Rodriquez et al. | |
| 2016/0267773 A1 | 9/2016 | Martin | |
| 2016/0294706 A1 | 10/2016 | Lang et al. | |
| 2018/0040216 A1 | 2/2018 | Scalisi | |
| 2018/0053225 A1 | 2/2018 | Siminoff | |
| 2018/0233010 A1 | 8/2018 | Modestine | |
| 2018/0342329 A1 | 11/2018 | Rufo | |
| 2019/0130718 A1 | 5/2019 | Alpert | |
| 2019/0174571 A1* | 6/2019 | Deenoo | H04W 76/11 |
| 2019/0230566 A1* | 7/2019 | Schneider | H04L 45/22 |

* cited by examiner

ANALOG AND DIGITAL COMMUNICATION SYSTEM FOR INTERFACING PLAIN OLD TELEPHONE SERVICE DEVICES WITH A NETWORK

CROSS REFERENCE TO RELATED APPLICATION

This application for a utility patent is a continuation of a previously filed utility patent, having the application Ser. No. 17/033,607, filed Sep. 25, 2020, which claims priority to U.S. Provisional Patent Application No. 62/905,710, filed Sep. 25, 2019.

BACKGROUND OF THE INVENTION

Field of the Invention

The present disclosure relates generally to telecommunications, and in particular to an analog and digital communication system providing interfacing of plain old telephone service (POTS) devices over Internet protocol connections via a network.

Background of the Invention

Communications systems based on the Internet protocol (IP) have developed enormously during the past few years. One of the attractive features is the availability of higher bandwidths, which enable very high transmission rates. For mobile communication technology, a recent standard for unlicensed mobile access (UMA) has been released, in which mobile stations equipped to enable communication via unlicensed spectrum technologies, such as WiFi or Bluetooth, utilize broadband IP networks for connecting to mobile communications systems.

However, POTS devices still require support and various existing solutions for such support exist. One such approach provides a device such as a hardware node that locally connects to the POTS device for converting the telephone call signals and transmitting the signals remotely over the Internet. The hardware node first packetizes POTS data (which are the telephone call signals) into IP packets, which are then sent over an IP network to a gateway node where the POTS data is then unpacked (depacketized) and forwarded to a POTS network. A problem with the latter type of solution is that new equipment would be needed at the user side as well as at the operator side. Thus, the user must consider the additional cost associated with the new equipment before utilizing such solutions. Moreover, these solutions may become problematic when network bandwidth slowdown issues and network bottleneck issues occur.

In terms of determining other solutions, the telecommunications industry has innovated technology that replaces analog copper lines which can be delivered over the Internet. Session Initiated Protocol (SIP) trunks are a viable and less expensive option when it comes to supplying a dial tone to a device that is not intended or mandated to function when there is a power failure. However, SIP trunks are not reliable in Life Safety applications (e.g., fire and burglar alarms, elevator and entry systems) because SIP trunks must be delivered over equipment that requires electricity. If there is no power, no service can be provided to these Life Safety applications. Hence, POTS device applications/Life Safety applications such as fire and burglar alarms, elevator and entry systems, all of which must have a fail-proof dial tone, are currently being serviced by increasingly more expensive analog copper circuits because these circuits independently carry 48 volts and require no external power source.

One possible resolution for using the existing supported remote network services in conjunction with the necessary traditional analog connections is to develop mobile stations for supporting different types of POTS equivalent services. The mobile stations can then be connected using, for example, the UMA technology. However, this approach requires more expensive and complicated mobile stations. Furthermore, it may not be possible to use POTS equivalent services at the same time as, for example, normal mobile telephony, since the mobile station is occupied.

U.S. patent application publication no. US 2008/0259886 with inventors Svarre et al., teaches an access point of an unlicensed mobile access network with an analog physical interface arranged for communication with POTS equipment. A converter connected to the analog physical interface converts POTS signalling into mobile communications signalling, and vice versa. The POTS-to-mobile converter is connected to a converter, preferably according to the User-Managed Access (UMA) standard for packeting and depacketing of mobile communications system signalling into IP packets. The POTS-to-mobile converter is provided with an identity that is interpretable by the mobile communications network. POTS services not directly available through the mobile communications network are preferably implemented in or in connection to the POTS-to-mobile converter.

A general problem with the prior art solutions for utilizing IP connections for POTS equivalent services is that they tend to be relatively expensive and complicated and may not account for network bandwidth issues. It is therefore an objective of the present disclosure to improve the possibilities of using IP networks to support POTS devices and to provide inexpensive and simple solutions as well as account for network bandwidth issues.

The present disclosure has advantages in the areas of availability and cost of operation. Cost advantages are achieved due to the fact that telephony POTS are integrated into mobile telephony at only an incremental cost. By reusing existing authentication according to mobile standards and, for example, UMA standards, subscriber activation and administration can be significantly reduced.

SUMMARY OF THE INVENTION

The present invention teaches certain benefits in construction and use which give rise to the objectives described below.

In an implementation, an analog and digital communication system establishes a connection between a plain old telephone service (POTS) device and a destination device. The analog and digital communication system includes a customer appliance. The customer appliance includes multiple ports, an internal power source device, a subscriber identification module (SIM) card, an electronic control unit, an analog to digital convertor, and a processor device. At least one of the ports are operably connected to the POTS device. The internal power source device includes a power input to provide power to the customer appliance via an external power source and a battery device to provide backup power to the customer appliance. The SIM card establishes communication between the customer appliance and a controller via a network. The electronic control unit includes a softswitch for a class 3 switch and a class 5 switch to facilitate dialing for the POTS device. The analog to digital converter converts analog and digital signals transmitted between the POTS device and the destination device.

The processing device is operatively coupled to a memory to execute instructions. The processing device packetizes and depacketizes the digital signals associated with a telephone call between the POTS device and the destination device. The controller communicates remotely with the customer appliance via the network to provide routing of the telephone call between the POTS device and the destination device. The controller is configured to at least one of transmit the telephone call or receive the telephone call via a closest public switched telephone network (PSTN) handoff or via an internal customer appliance network establishing a connection between the customer appliance and a second customer appliance. The controller facilitates a best quality of the telephone call to ensure a quality of service (QoS).

In an implementation, an analog and digital communication system establishes a connection between a plain old telephone service (POTS) device and a destination device. The analog and digital communication system includes a first customer appliance and a second customer appliance. Each of the first customer appliance and the second customer appliance includes multiple ports, an internal power source device, a SIM card, an electronic control unit, an analog to digital converter, and a processing device. At least one of the multiple ports are operably connected to the POTS device. The internal power source device includes a power input to provide power to a respective customer appliance via an external power source and a battery device to provide backup power to the respective customer appliance. The SIM card establishes communication between the respective customer appliance and a controller via a network. The electronic control unit includes a softswitch for a class 3 switch and a class 5 switch to facilitate dialing for the POTS device. The analog to digital converter converts analog and digital signals transmitted between the POTS device and the destination device. The processing device is operatively coupled to a memory to execute instructions. The processing device packetizes and depacketizes the digital signals associated with a telephone call between the POTS device and the destination device. The controller communicates remotely with the first customer appliance and the second customer appliance via the network to provide routing of the telephone call between the POTS device operably coupled to the first customer appliance and the destination device operably coupled to the second customer appliance. The controller is configured to at least one of transmit the telephone call or receive the telephone call via an internal customer appliance network establishing a connection between the first customer appliance and the second customer appliance. The controller facilitates a best quality of the telephone call to ensure a quality of service (QoS).

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The advantages and features of the present invention will become better understood with reference to the following more detailed description taken in conjunction with the accompanying drawings in which.

DETAILED DESCRIPTION OF THE INVENTION

Figure 1:
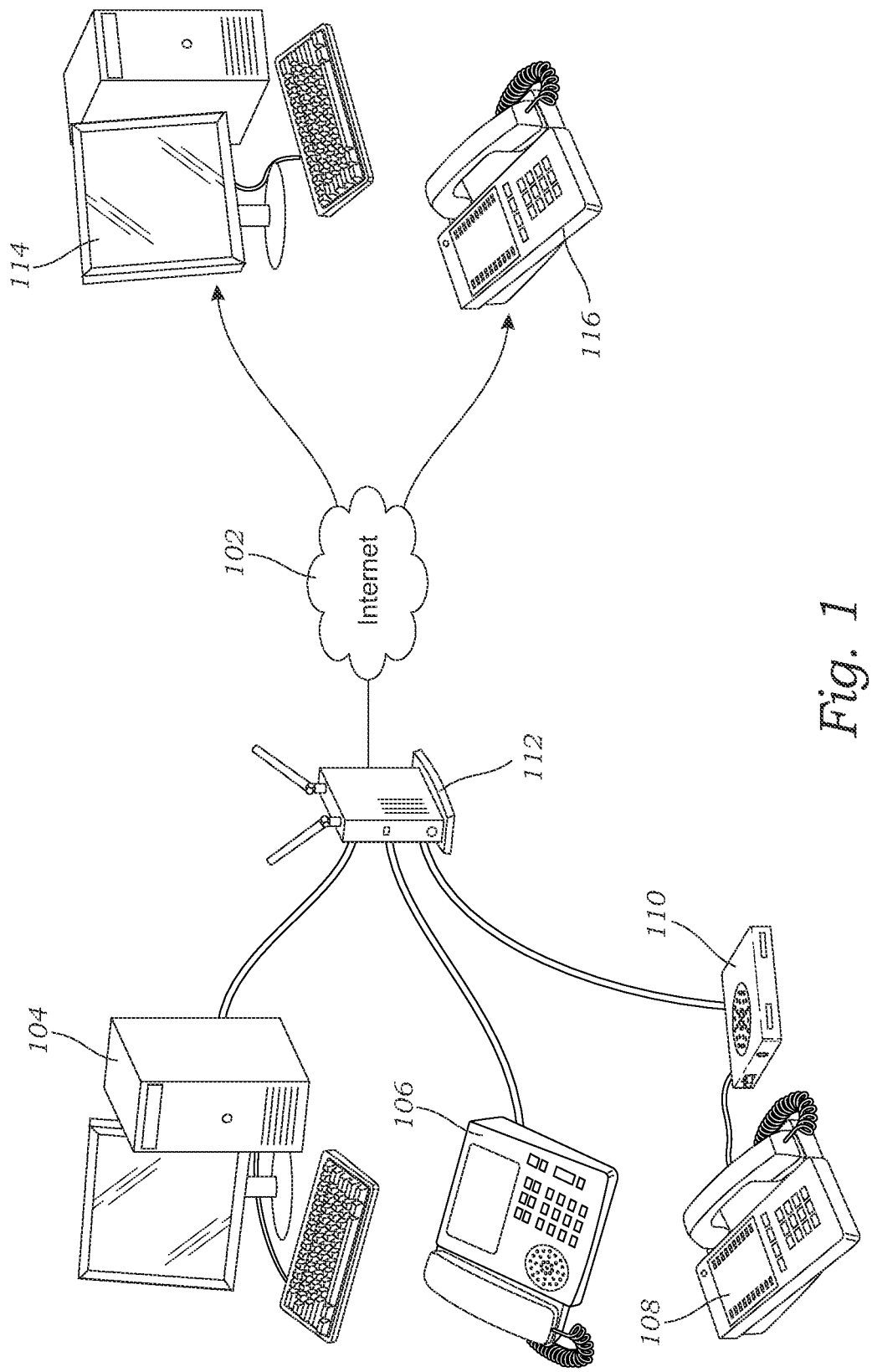
FIG. 1 is a block diagram of prior art solutions to integrate POTS device with other devices to route calls.

Communication systems utilizing the Internet have been developed extensively during the last few years. Present day Internet-based communication systems have enabled much faster transmission rates due to high bandwidth as compared to past systems, and therefore, many services have migrated away from POTS systems. However, some essential systems may be still be required to utilize POTS services, due to the nature of consistency and reliability of analog circuitry in scenarios of electrical outages and other emergency situations.

The prior art contains multiple examples of solutions to connect these POTS systems. Most of these provide a hardware node connected to the POTS devices that converts an analog signal to digital data and which them packetizes the digital data into Internet protocol (IP) packets. Instead of signal transmission via copper analog lines, transmission via the Internet using session initiated protocol, and transmission via mobile stations for supporting different types of POTS devices are provided. However, these types of solutions tend to be relatively expensive and complicated and may not be reliable.

The objective of the present disclosure is to improve the possibilities of using IP networks for POTS devices in an inexpensive and simple manner by integrating plain old telephone services into mobile telephony services. The present disclosure provides an analog and digital communication system that establishes a connection between a plain old telephone service (POTS) device and a destination device in order to allow reliable communication between these devices. The analog and digital communication system includes a customer appliance. The customer appliance includes multiple ports, an internal power source device, a subscriber identification module (SIM) card, an electronic control unit, an analog to digital convertor, and a processor device. At least one of the ports are operably connected to the POTS device. The internal power source device includes a power input to provide power to the customer appliance via an external power source and a battery device to provide backup power to the customer appliance. The SIM card establishes communication between the customer appliance and a controller via a network. The electronic control unit includes a softswitch for a class 3 switch and a class 5 switch to facilitate dialing for the POTS device. The analog to digital converter converts analog and digital signals transmitted between the POTS device and the destination device. The processing device is operatively coupled to a memory to execute instructions. The processing device packetizes and depacketizes the digital signals associated with a telephone call between the POTS device and the destination device. The controller communicates remotely with the customer appliance via the network to provide routing of the telephone call between the POTS device and the destination device. The controller is configured to at least one of transmit the telephone call or receive the telephone call via a closest public switched telephone network (PSTN) handoff or via an internal customer appliance network establishing a connection between the customer appliance and a second customer appliance. The controller facilitates a best quality of the telephone call to ensure a quality of service (QoS).

In FIG. 1, a POTS device 108 (i.e., a plain old telephone device which communicates via transmission of analog signals) connects to an adapter 110 via a telephone cable (e.g. a registered Jack (RJ)11 wire). If a user operating the POTS device 108 wishes to make a call to a personal computer 114 or a POTS device 116 (also referred to as terminating or destination devices), the user may pick up the POTS device 108, wait for a dial tone and initiate a telephone call by dialling the phone number of a corresponding destination device. The adapter 110 provides Voice-over-IP (VoIP) services and converts the analog signals output from the POTS device 108 to packetized digital signals before transmission over the Internet 102 via a modem 112. The packetized digital signals are then provided to an appropriate destination device (e.g., the personal computer 114 or the POTS device 116) via the Internet 102.

Suppose that a personal computer 104 or a VoIP phone 106 wish to make a telephone call to a destination device (e.g., the personal computer 114 or the POTS device 116). A user operating the personal computer 104 or the VoIP phone 106 may input a phone number associated with the destination device into either the personal computer 104 or the VoIP phone 106, respectively, in order to connect a digital telephone call. As the signals output by the personal computer 104 or the VoIP phone 106 are already packetized digital signals, there is no need for an adapter to convert the signals. The packetized digital signals are transmitted to the appropriate destination device via the modem 112 which transmits the packetized digital signals over the Internet 102.

The problem with the prior art solution is that it does not provide a secure fail-safe system for a POTS device in conjunction with Life Safety equipment while maintaining quality of service (QoS). In addition, the prior systems are expensive and complicated.

Figure 2:
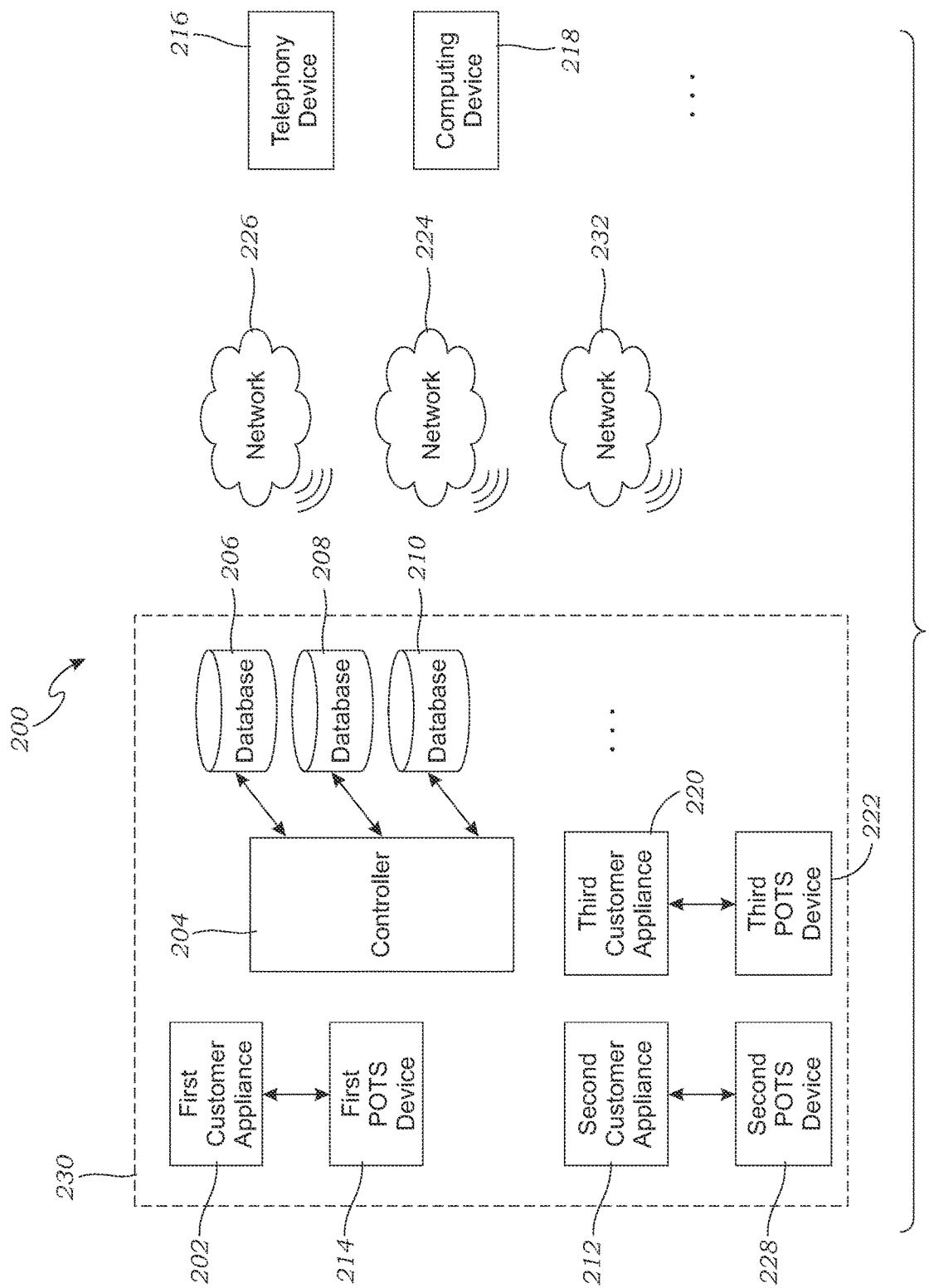
FIG. 2 illustratively depicts a system for interfacing POTS devices over a network, in accordance with an implementation of the present disclosure.

FIG. 2 illustratively depicts an intercommunication system 200 for interfacing POTS devices over a network, in accordance with an implementation of the present disclosure. The intercommunication system 200 includes an analog and digital communication system 230, which includes a first external device 216, a second external device 218, . . . , etc. The analog and digital communication system 230 also includes a customer appliance 202, a controller 204, a first database (DB) 206, a second DB 208, a third DB 210, a second customer appliance 212, a first POTS device 214, a second POTS device 228, a third customer appliance 220, . . . , and a third POTS device 222, . . . , etc. The various devices/customer appliances and the controller 204 in the analog and digital communication system 230 may connect to a first network 224. The controller 204 and/or other devices/customer appliances in the analog and digital communication system 230 and the external devices 216 and 218 may connect to a second network 232. Additionally, the various devices/customer appliances and the controller 204 in the analog and digital communication system 230 may connect to a third network 226. Additional devices and/or networks than depicted may be included.

Suppose that a user employing a POTS device within the analog and digital communication system 230 wishes to place a telephone call to a destination device in a reliable manner. In order to route the call to the destination device, the customer appliance (to which the POTS device is operably connected to) transmits a signal to the controller 204 which appropriately facilitates the completion of the call by handing off or transmitting the signal to the destination device. Similarly, if a POTS device within the analog and digital communication system 230 is the recipient of an incoming call, the controller 204 and the customer appliance to which the POTS device is operably connected to, route the call to the POTS device. Details regarding the above described call connectivity are described herein below.

In an implementation, the first POTS device 214, the second POTS device 228, and the third POTS device 222 may be a telephone, a fax, a fire alarm, or another POTS device. The first network 224, the second network 232, and/or the third network 226 may be a bidirectional network including a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), a PSTN, routers, hubs, switches, server computers, and/or a combination thereof. In an implementation, the first network 224 may be a bidirectional network including the Internet and/or a private network. The private network may include a bidirectional tunnel. In an implementation, the third network 226 may be an LTE network or any other known mobile network. The third network 226 may be replaced with a known mobile technology network such as 4G and 5G, or a future mobile technology network. In an implementation, the second network 232 may be the Internet or a public switch telephone network (PSTN).

In one implementation, the controller 204 may be one or more computing devices (such as a rackmount server, a router computer, a server computer, a personal computer, a mainframe computer, a laptop computer, a tablet computer, a desktop computer, etc.) and may include or otherwise be connected to various databases, software components, and/or hardware components.

In an implementation (not depicted), an internal customer appliance network may be established between the customer appliances and the controller 204 via the first network 224 and/or the third network 226. The controller 204 may communicate remotely with one of the customer appliances via a private network.

In one implementation, the first DB 206, the second DB 208, and third DB 210 may each be a memory (e.g., random access memory), a cache, a drive (e.g., a hard drive), a flash drive, a database system, or another type of component or device capable of storing data. Each of the first DB 206, the second DB 208, and third DB 210 may also include multiple storage components (e.g., multiple drives or multiple databases) that may also span multiple computing devices (e.g., multiple server computers). The first DB 206, the second DB 208, and third DB 210 may each be an independent data center or a part of a data center. The first DB 206, the second DB 208, and the third DB 210 may communicate remotely with the controller 204 or communicate locally with the controller 204 within a single server or multiple servers. The first DB 206, the second DB 208, and the third DB 210 may be remote storage devices in communication with the controller 204 and may include a database of multiple customer appliances.

The first external device 216 and the second external device 218 may be a computing device such as a personal computer (PC), a laptop, a mobile phone, a smart phone, a tablet computer, a netbook computer, a VoIP telephone, or a POTS device.

In an implementation, multiple ports may be operably connected to the second POTS device 228. For example, these ports include RJ45 ports, RJ11 ports, or other ports. The first POTS device 214 is operably connected to the customer appliance 202. The second POTS device 228 is operably connected to the second customer appliance 212. The third POTS device 222 is operably connected to the third customer appliance 220. Various methods of connecting devices with customer appliances are described herein below.

Referring again to FIG. 2, the controller 204 may be connected to or be otherwise in communication with multiple databases. As depicted in FIG. 2, the controller 204 is in communication with the DB 206, DB 208, and DB 210. At least one of the DB 206, the DB 208, and/or the DB 210 may store data regarding the various customer appliances that are capable of communication with the controller 204. In an implementation, DB 206, the DB 208, and/or the DB 210 may store data regarding the customer appliance 202, the second customer appliance 212, the third customer appliance 220, etc., as well as the POTS devices, and their respectively assigned telephone numbers, operably connected to each customer appliance. The customer appliances may register with the controller 204 when it goes online (i.e., when a customer appliance establishes a network connection and connects to the controller 204) or at various times. When a customer appliance registers with the controller 204, the controller 204 may assign an encryption key and store the key in or more of the databases related to the customer appliance. Data stored in one or more of the databases includes the identity of the telephone number(s) associated with the customer appliance (e.g., the telephone numbers of the devices connected thereto), a log of the customer appliances' connection and/or disconnection times and details, a list of the types of devices (e.g., POTS devices, Internet-enabled telephone devices, etc.) associated with each customer appliance, a serial number of the customer appliance, an encryption key of the customer appliance and the physical location or coordinates of the customer appliances. Full Call Detail Records (CDR), protocol, codecs used handshake method, call disposition may be stored in the databases.

In other implementations (not depicted), the controller 204 may be placed local to or at the same position as a customer appliance.

In the depicted implementation, the controller 204 communicates remotely with the customer appliance 202, the second customer appliance 212, and the third customer appliance 220 via an open session (e.g., Session Initiated Protocol (SIP)) and via at least the first network 224 or the third network 226 to provide a routing of a telephone call placed between POTS devices. In one example, the controller may open a session via SIP. SIP is a signaling protocol used to establish a "session" between 2 or more participants, modify that session, and eventually terminate that session. The controller 204 may use other VoIP technology to open a session. The controller 204 may transmit a telephone call to an appliance or a device and/or receive a telephone call from an appliance or a device. In an implementation, the controller 204 may provide routing of telephone calls placed between POTS devices within the analog and digital communication system 230 via the first network 224. In another implementation, the controller 204 may provide routing of telephone calls placed between a POTS device within the analog and the digital communication system 230 and a device external to the analog and digital communication system 230 via the second network 232. The controller 204 may be a gateway to a PSTN for the POTS device within the analog and the digital communication system 230. The controller 204 may provide an encryption to a telephone call originated from an unsecured device external to the analog and digital communication system 230. In other implementations, the controller 204 may use either the first network 224 or the second network 232 to provide routing of any call.

The controller 204 is further configured to facilitate the best quality of a telephone call to ensure a quality of service (QoS). For example, when the first network 224 or the third network 226 experience a latency or a packet dropping due to a connectivity issue or reduced bandwidth, the controller 204 may vary the bitrate of signal data between an originating call device and a terminating call device to ensure continuation of a telephone call without lag or a sudden disconnection of the telephone call. The controller 204 may also rearrange the packets properly to handle the latency or jitters. Moreover, by bringing in a central office to the user premise allows the controller and connected devices to eliminate any latency and jitter with visibility and built-in redundancy. Furthermore, the controller 204 may tag the packets for processing prioritization.

In one example, when a user employing the first POTS device 214 dials the telephone number of and starts to make a telephone call to the first external device 216, the first POTS device 214 provides an analog signal to the customer appliance 202. The first POTS device 214 is connected to the customer appliance 202 and the first external device 216 is a destination device. The customer appliance 202 converts the analog signal received from the first POTS device 214 into a packetized digital signal. More specifically, an analog to digital converter and digital to analog converter (ADC/DAC) and a processing device, described herein below perform such a conversion. In one implementation, the ADC/DAC may perform the conversion and the processing device may perform packetizing and depacketizing. In other implementations, the conversion and packetizing (and depacketizing) may be performed by one device. The packetized digital signal is then sent to the controller 204 via at least the first network 224 or the third network 226. The controller 204 remotely connects with the customer appliance 202 via at least one of the first network 224 or the third network 226.

The customer appliance 202 may specify a preferred network to be used for transmissions. The preferred network may be used whenever it is available, and one or more secondary networks may be used when the preferred network is unavailable. In other implementations, the preferred network may be used during certain times of the day (e.g., during peak or off-peak network connection hours), when the preferred network is determined to be more reliable than other networks, or on certain days or at other time intervals as specified by a user. Furthermore, the preferred and secondary networks may vary based on the type of device connected to the customer appliance 202 that originates the telephone call. In an implementation, the customer appliance 202 may specify the third network 226 as the preferred network and may attempt to transmit the packetized digital signal via third network 226 first, if it is available. If the third network 226 is not available or does not have sufficient bandwidth as determined by the customer appliance 202, the customer appliance 202 may transmit the packetized digital signal via secondary networks such as the first network 224. In other implementations, the customer appliance 202 may attempt to transmit signals via a secondary network first, and if the transmission is not successful or there is a connectivity or bandwidth problem, the customer appliance 202 may attempt to transmit signals via a primary network or different secondary networks.

After the signals are received by the controller 204 via a preferred network, the controller 204 opens a session. The controller 204 then receives the packetized digital signal from the customer appliance 202. The originating device in this example is the first POTS device 214 or otherwise, the controller 204 may recognize the originating device as a device connected to the customer appliance 202 or the customer appliance itself. The destination device is the device which is associated with the telephone number the user dials. The controller determines the identification of destination device and the originating device as follows. First, the controller 204 searches for the information regarding the destination device via at least one of the DB 206, the DB 208, and the DB 210. The information regarding the destination device may be identification data associated with the destination device. The information regarding the destination device may include a telephone number, an IP address, a public key for encryption/decryption, a unique device identification number, etc. As described above, customer appliances within the analog and digital communication system 230 may register with the controller 204 when online or at various times and one or more databases may store information related to the customer appliance. Such information includes the identity of the telephone number(s) associated with a customer appliance (e.g., the telephone numbers of the devices connected thereto), a log of the customer appliances' connection and/or disconnection times and details, a list of the types of devices (e.g., POTS devices, Internet-enabled telephone devices, etc.) associated with each customer appliance, and the physical location or coordinates of the customer appliances.

Second, the controller 204 may search for the information about the destination device via at least one of the DB 206, the DB 208, and the DB 210. For example, if the second customer appliance 212 and the second POTS device 228 are registered and stored in one of the databases that are a part of the analog and digital communication system 230, the controller facilitates routing of calls between the first POTS device 214 and the destination device, the second POTS device 228.

In response to the controller 204 making a determination that the destination device is the second POTS device 228 (or that the destination device is a device associated with the second customer appliance 212), the controller 204, which is remotely connected to the second customer appliance 212, transmits the packetized digital signal to the second customer appliance 212. The second customer appliance 212 then receives the packetized digital signal. The second customer appliance 212 depacketizes and converts it into an analog signal and transmits the analog signal to the second POTS device 228 (which is operably connected to the second customer appliance 212) to complete the telephone call. The telephone call is then terminated.

In another example, suppose that a user employing the first POTS device 214 wishes to make a telephone call to another user employing the first external device 216, a destination device, and dials a phone number associated with the first external device 216. The first POTS device 214 starts to make a telephone call to the first external device 216, a destination device, and then the first POTS device 214 provides an analog signal to the customer appliance 202. The customer appliance 202 converts the analog signal received from the first POTS device 214 into a packetized digital signal. The packetized digital signal is sent to the controller 204 via the first network 224 and/or the third network 226. As described above, the customer appliance 202 may attempt to transmit the packetized digital signal via a preferred network, if it is available; and if it is not available, one or more secondary networks may be used.

The customer appliance 202 may specify a preferred network to be used for transmissions. The preferred network may be used whenever it is available, and one or more secondary networks may be used when the preferred network is unavailable. In other implementations, the preferred network may be used during certain times of the day (e.g., during peak or off-peak network connection hours), when the preferred network is determined to be more reliable than other networks, or on certain days or at other time intervals as specified by a user. Furthermore, the preferred and secondary networks may vary based on the type of device connected to the customer appliance 202 that originates the telephone call. In an implementation, the customer appliance 202 may specify the third network 226 as the preferred network and may attempt to transmit the packetized digital signal via third network 226 first, if it is available. If the third network 226 is not available or does not have sufficient bandwidth as determined by the customer appliance 202, the customer appliance 202 may transmit the packetized digital signal via secondary networks such as the first network 224. In other implementations, the customer appliance 202 may attempt to transmit signals via a secondary network first, and if the transmission is not successful or there is a connectivity or bandwidth problem, the customer appliance 202 may attempt to transmit signals via a primary network or different secondary networks.

After the signals are received by the controller 204 via a preferred network, the controller 204 opens a session. The controller 204 then receives the packetized digital signal from the customer appliance 202. The originating device in this example is the first POTS device 214 or otherwise, the controller 204 may recognize the originating device as a device connected to the customer appliance 202 or the customer appliance itself. The destination device is the device which is associated with the telephone number that the user dials. The controller determines the identification of destination device and the originating device as follows: First, the controller 204 searches for the destination information via one or more of DB 206, the DB 208, and the DB 210. The destination information is data associated with the destination device. The destination information may include a telephone number, an IP address, a public key for encryption/decryption, a unique device identification number, etc. Second, the controller 204 may search for the relative information about the destination via one or more of DB 206, the DB 208, and the DB 210. If the destination information is found to be an external device (e.g. not registered with the controller 204 and no relative information is stored) the controller 204 may transmit the packetized digital signal to a network outside of the analog and digital communication network 230. Since the first external device 216 is not registered with the controller 204 and its information is not stored within at least one of DB s, the controller 204 routes the calls to the first external device 216 via the second network 232.

In response to the controller 204 making a determination that destination device is the first external device 216, the packetized digital signal is transmitted to the first external device 216 via the second network 232. The packetized digital signal is depacketized and converted to an analog signal by the first external device 216 to complete the telephone call. The telephone call is then terminated.

In the prior examples provided, the controller 204 may vary the bit rate of the digital signal to prevent bad quality or dropping of telephone calls, which enables an error-free dial tone to POTS devices, modems, Supervisory Control and Data Acquisition (SCADA) devices and Point of Sale devices. The bit rate is determined in view of a network connectivity or bandwidth and is varied as needed. For example, SCADA devices and Point of Sale devices may be modems, automated teller machines (ATM), cash machines such as money grams, vending machines, etc.

Figure 3:
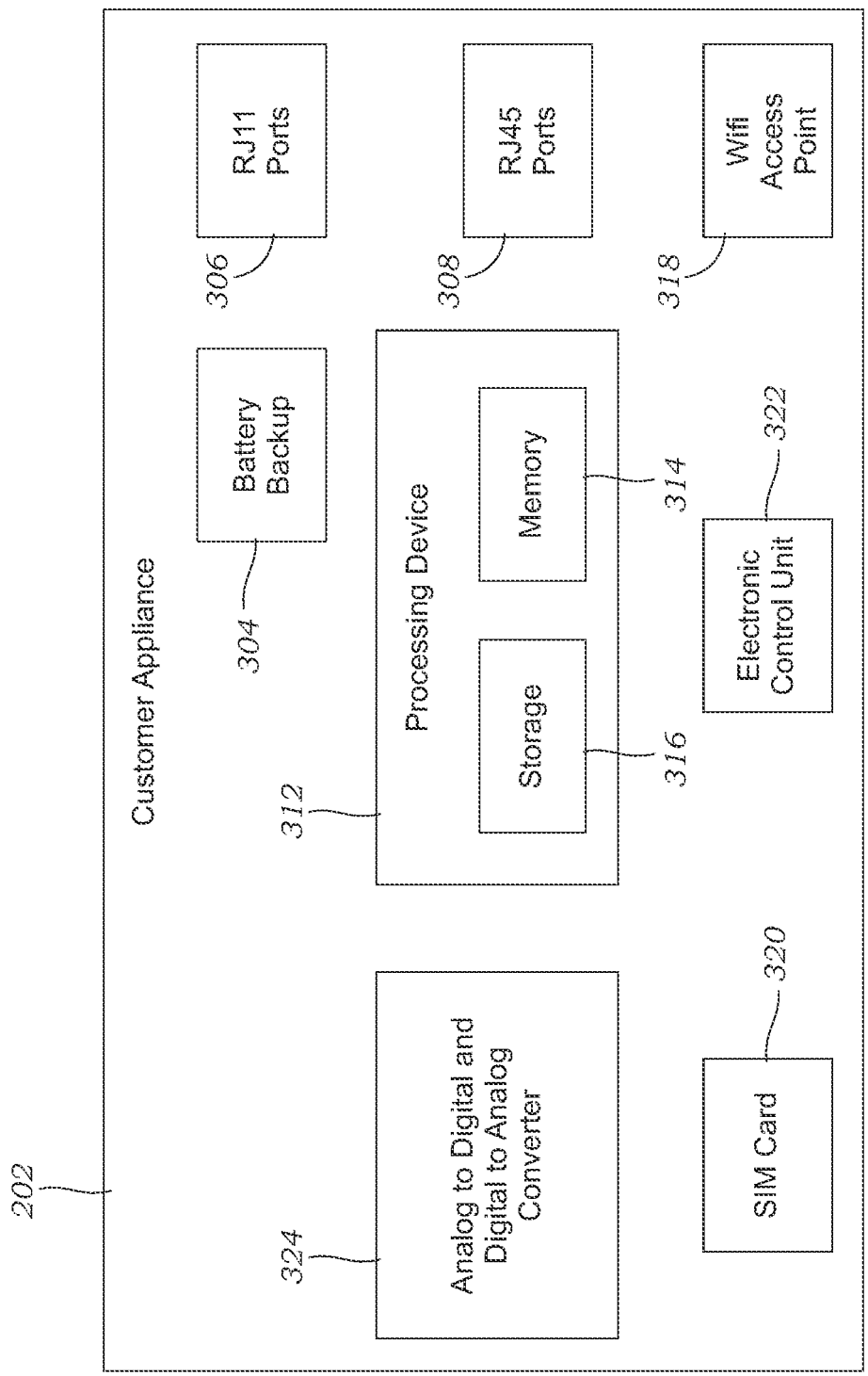
FIG. 3 is a block diagram of a customer appliance, in accordance with an implementation of the present disclosure.

FIG. 3 is a block diagram of a customer appliance, in accordance with an implementation of the present disclosure. Specifically, FIG. 3 describes details of customer appliance 202 in FIG. 2, however, other customer appliances in FIG. 2 may include similar features. The customer appliance 202 includes a battery backup 304, RJ11 ports 306, RJ45 ports 308, a processing device 312 comprising a memory 314 and a storage 316, an access point 318, a subscriber identification module (SIM) card 320, an electronic control unit (ECU) 322, and an analog to digital converter (ADC) and digital to analog converter (DAC) 324.

The battery backup 304 provides power to the customer appliance 202 and allows the customer appliance 202 to function without an external power source. For example, in the event of a power outage, the customer appliance 202 can supply a dial tone to all connected devices (including Life Safety devices that rely on a live connection). Examples of Life Safety devices include fire alarms, burglar/safety alarms, elevator phones, entry systems, etc.

The RJ11 ports 306 provides an interface to POTS devices and at least one of the RJ11 ports 306 is operably connected to a POTS device. RJ45 ports 308 provide an interface (e.g. connectable via a T1 line) to an Ethernet connection to the first network 224. The SIM card 320 establishes a communication between the customer appliance 202 and the controller 204 via the third network 226. The Ethernet connection and the mobile network connection via the SIM card 320 provide a backup to each other for the customer appliance 202 in case the other one fails.

The processing device 312 is operatively coupled to the memory 314 and executes instructions stored in the storage 316. The processing device 312 packetizes and depacketizes digital signals associated with a telephone call between a POT device and a destination device. The processing device 312, in communication with the battery backup 304, packet-switches the packetized digital signal to improve speed and power efficiency when compared to a telephone-style circuit switching technology. The ECU 322 includes a softswitch for a class 3 and a class 5 switch to facilitate dialing for a POTS device operably connected to the customer appliance 202. The class 3 and the class 5 switches provide dial tone and local/regional exchange of POTS devices. The ADC and DAC 324 convert analog and digital signals transmitted between the POTS device and the destination device. An ADC converts an analog signal to a digital signal, and a DAC converts a digital signal to an analog signal. When a POTS device operably connected to the customer appliance 202 is an originating call device placing a call to a destination device, the ADC and DAC 324 convert an analog signal received from the POTS device into a packetized digital signal before the call is routed to the destination device. When the POTS device is a destination or terminating call device and is the recipient of a call placed by another device, the ADC and DAC 324 convert an incoming digital signal to an analog signal.

In an implementation, the customer appliance 202 further includes a modem, a speaker, a microphone and a voice gateway. The modem may provide an analog dial tone connectivity to the first network 224. The voice gateway along with the speaker and the microphone may provide Session Initiated Protocol (SIP) and Voice of LTE (VoLTE) signaling with an internal softswitch feature, Primary Rate Interface (PRI), SIP integration, SIP trunking, SIP disaster recovery, compatibility and companion to One Talk and other VoIP platforms, a POTS replacement, and wide area network (WAN) failover.

In an implementation, a 66 block may be operably connected to the customer appliance 202 to provide further connection to a telephone system. In an implementation, the 66 block may be used as hand off method. The processing device 312 may comprise a high-performance, multi-threaded core. The battery backup 304 may be a lithium-ion battery. The battery backup 304 may be an internal power source device comprising a power input to provide power to the customer appliance 202 via an external power source and a battery to provide backup power to customer appliance 202.

In an implementation, multiple Ethernet connections may be established via the RJ45 ports to provide a failover dual local area network (LAN) and/or wide area network (WAN) capabilities. The customer appliance 202 may use multiple network connection simultaneously. The RJ11 ports and the RJ45 ports may have up to eight ports. The access point 318 may provide a WIFI access to a WIFI capable device and provide a WAN capability. The customer appliance 202 may provide an end-to-end encryption of a telephone call in order to provide a secure telephone call. The customer appliance 202 may include other types of registered jack (RJ) ports and may be operably connected to a T1 line via one of the RJ ports. The customer appliance 202 may provide a notification of a terminating call to a user via a text message or an email. A private network communication may be facilitated via the SIM card 320.

In an implementation, the customer appliance 202 may include a visual caller ID, a fax capability, and/or any other structure which is commonly found on similar devices. The customer appliance 202 may include the system HIPAA-compliant fax gateway that sends and receives a fax over encrypted and secure connections, with storage in the cloud.

Figure 4:
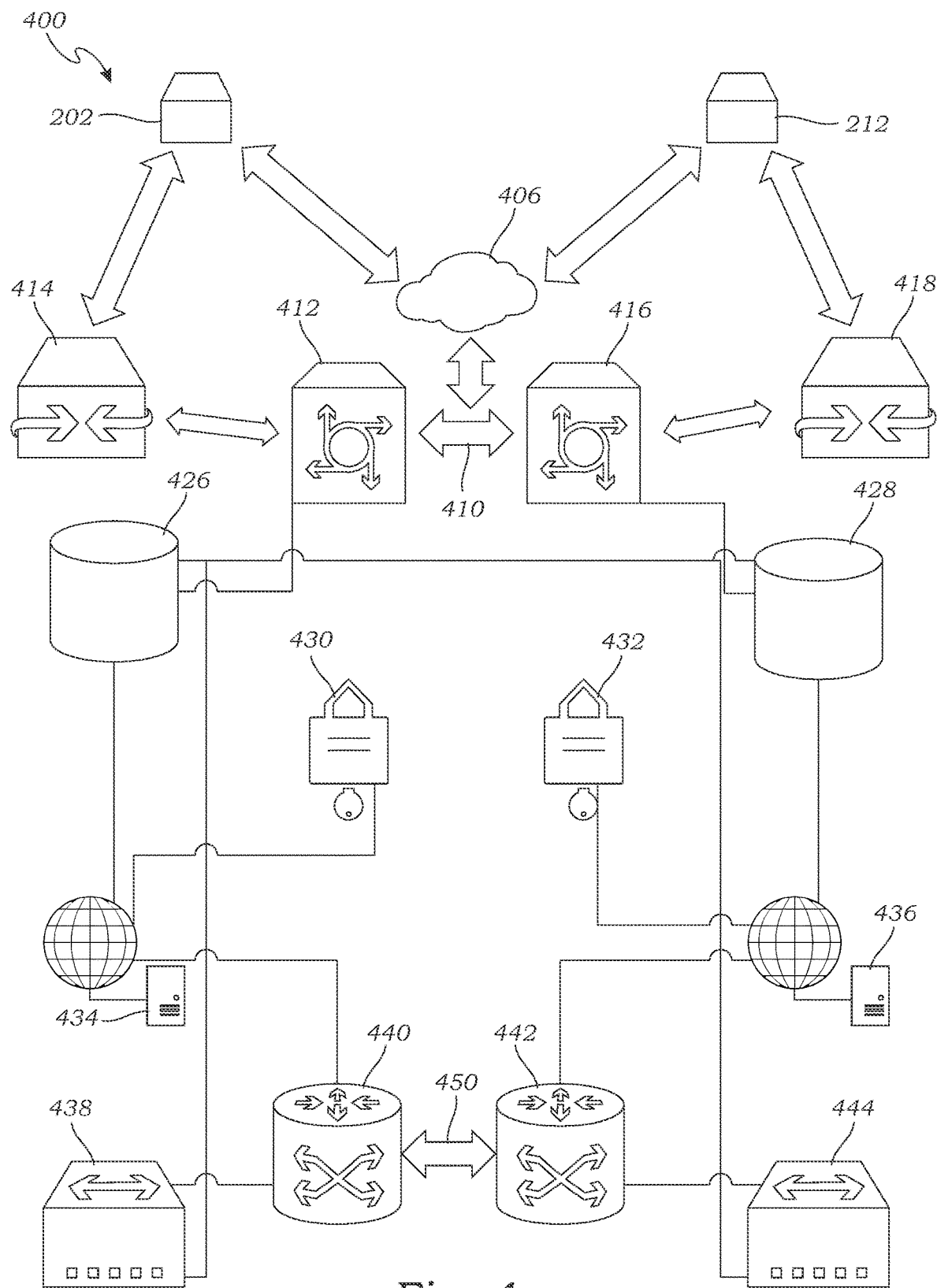
FIG. 4 illustratively depicts a conceptual diagram of controllers in a datacenter, in accordance with an implementation of the present disclosure.

FIG. 4 illustratively depicts a conceptual diagram 400 of controllers in a datacenter, in accordance with an implementation of the present disclosure. Although various apparatuses depicted in FIG. 2 are exemplary objects depicted in FIG. 4, in other implementations, other apparatuses may instead be used. Further fewer or more apparatuses than depicted in FIG. 4 may be provided in the datacenter. The conceptual diagram 400 depicts the customer appliances 202, the second customer appliance 212, a network 406, a first controller 412, a second controller 416, a first Encapsulating Security Protocol (ESP) router 414, a second ESP router 418, a first storage 426, a second storage 428, a third storage 440, a fourth storage 442, a first identity access management (IAM) service 430, a second IAM service 432, a first web server 434, a second web server 436, a first free switch node 438, and a second free switch node 444. The first controller 412 and the second controller 416 depicted in FIG. 4 may be similar to or the same as the controller 204 in FIG. 2. Therefore, the description of the controller 204 may apply equally to the first controller 412 and/or the second controller 416. In one implementation, the first controller 412 and the second controller 416 provide routing of incoming calls to and outgoing calls from the customer appliance 202, and the second customer appliance 212, respectively.

The network 406 may be a bidirectional network including a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), a PSTN, routers, hubs, switches, server computers, and/or a combination thereof. In an implementation, the network 406 may be the Internet.

Referring to the above, ESP is a proprietary security encapsulated SIP protocol. In some implementations, an encryption tunnel and the SIP are used separately. In other implementations such as described above, the ESP may allow an encryption tunnel and SIP used simultaneously.

In one implementation, the first storage 426, the second storage 428, the third storage 440, and the fourth storage 442 may each be a memory (e.g., random access memory), a cache, a drive (e.g., a hard drive), a flash drive, a database system, or another type of component or device capable of storing data. Each of the first storage 426, the second storage 428, the third storage 440, and the fourth storage 442 may also include multiple storage components (e.g., multiple drives or multiple databases) that may also span multiple computing devices (e.g., multiple server computers).

Referring to FIG. 4, the first controller 412 and the second controller 416 communicate bi-directionally to form a first cluster 410, as depicted by the bi-directional arrow. Thus, the first controller 412 and the second controller 416 may correspond with each other directly or via the network 406. The customer appliance 202 and the second customer appliance 212 may remotely communicate with the first cluster 410 via the network 406 using various implementations, including a bidirectional ESP tunnel. The customer appliance 202 may also communicate locally or remotely with the first controller 412 via the ESP tunnel LTE, which is the bidirectional ESP tunnel applied over LTE. The first controller 412 may communicate locally or remotely with the first ESP router 414. Similarly, the second customer appliance 212 may also communicate locally or remotely with the second controller 416 via the ESP tunnel LTE. The second controller 416 may communicate locally or remotely with the second ESP router 418. Call routing information and encrypted voice traffic are transferred between the controllers and the ESP routers.

In an implementation, the first controller 412 may be locally or remotely connected to the first storage 426. The second controller 416 may be locally or remotely connected to the second storage 428. The first storage 426, the second storage 428, the third storage 440, the fourth storage 442, the first IAM service 430, the second IAM service 432, the first web server 434, the second web server 436, the first free switch node 438, and the second free switch node 444 may be locally or remotely connected to each other to create the datacenter.

The third storage 440 and the fourth storage 442 form a second cluster 450, as depicted by the bi-directional arrow. Thus, the third storage 440 and the fourth storage 442 may correspond with each other directly or via a network.

A user may view data stored in the databases of the datacenter. The user may also provide changes to rules, protocols, and other specifications stored within the controllers. For example, if the user wishes to add or remove customer appliances, the user may perform these changes via the controllers. The first web server 434 and the second web server 436 allow the user to access one or more of the databases in the datacenter via the first IAM service 430 and the second IAM service 432. The first web server 434 and the second web server 436 may be a software and/or a hardware dedicated to store the controller's software and the controller's website component files (e.g. HTML documents, images, CSS stylesheets, and JavaScript files). The web servers are connected to the Internet and support the exchange of physical data with other devices connected to the controller via the web. The IAM services provide a secure control access to web server/datacenter resources. The IAM services control who is authenticated and authorized to use resources.

Figure 5:
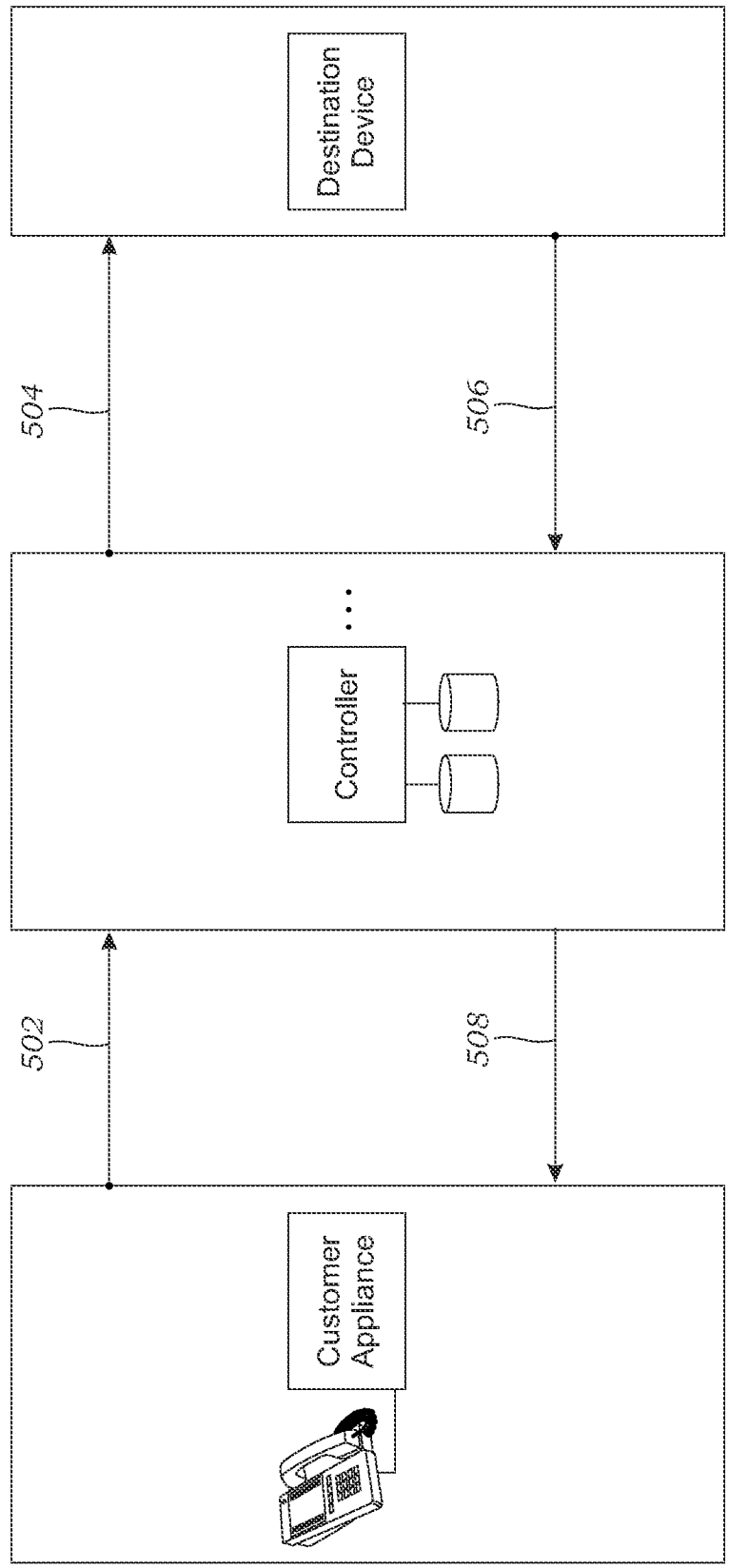
FIG. 5 is a call flow diagram of routing an outgoing call and an incoming call, in accordance with an implementation of the present disclosure.

FIG. 5 is a call flow diagram of routing an outgoing call and an incoming call, in accordance with an implementation of the present disclosure. FIG. 5 is described in a reference to FIG. 2. In one example, suppose a user employing the first POTS device 214 (which is operably connected to the customer appliance 202) wishes to make a telephone call to a destination device. Before dialing the number to connect a phone call, when the user picks up a handset, selects a speaker phone or other speaker or output device connected to the first POTS device 214, the customer appliance 202 provides the first POTS device 214 with a dial tone. The user then dials a telephone number of a destination device. The analog signal from the first POTS device 214 is transmitted to the customer appliance 202. The customer appliance 202 then converts the analog signal to a digital signal and packetizes the digital signal.

Referring again to FIG. 5, in step 502, the customer appliance 202 transmits the packetized digital signal to the controller 204. The controller 204 receives the packetized digital signal, and determines the identity or origin of the originating and terminating/destination devices. The originating device in this example is the first POTS device 214. The controller 204 may recognize the originating device as a device connected to the customer appliance 202 or the customer appliance itself. The destination device is the device which is associated with the telephone number that the user dials. Determination of the destination device and the originating device may be determined by the controller by reviewing database(s), as described above.

In step 504, the controller 204 routes the telephone call to the destination device. The controller 204 may route the packetized digital signals to another customer appliance via the analog and digital communication system 230 in response to determining that the destination device is within the analog and digital communication system 230. Otherwise, the controller 204 determines that the destination device is external and performs a PSTN handoff to a Mobile Telephone Switching Office (MTSO) if the destination device is a mobile device or a PSTN central office if the destination device is a POTS device.

The controller 204 may also perform QoS checks and routing.

A call where the first POTS device 214 becomes a destination device and recipient of an incoming call may be referred to as a return call. The call may be transmitted as digital or analog signals. In step 506, the destination device places a telephone call, which is transmitted to the controller 204. The controller determines the identity of the destination device and routes call accordingly. The controller may determine identity of the destination device by reviewing database(s), as described above. Moreover, the controller 204 may recognize the destination device as a device connected to a customer appliance or the customer appliance itself. Determination of the destination device and the originating device may be determined by the controller by reviewing database(s), as described above.

In step 508, the controller transmits the call to the customer appliance 202, which converts the digital signals to analog signals. The first POTS device 214 operably connected to the customer appliance 202 rings and connects to the call when picked up.

Figures 6, 7:
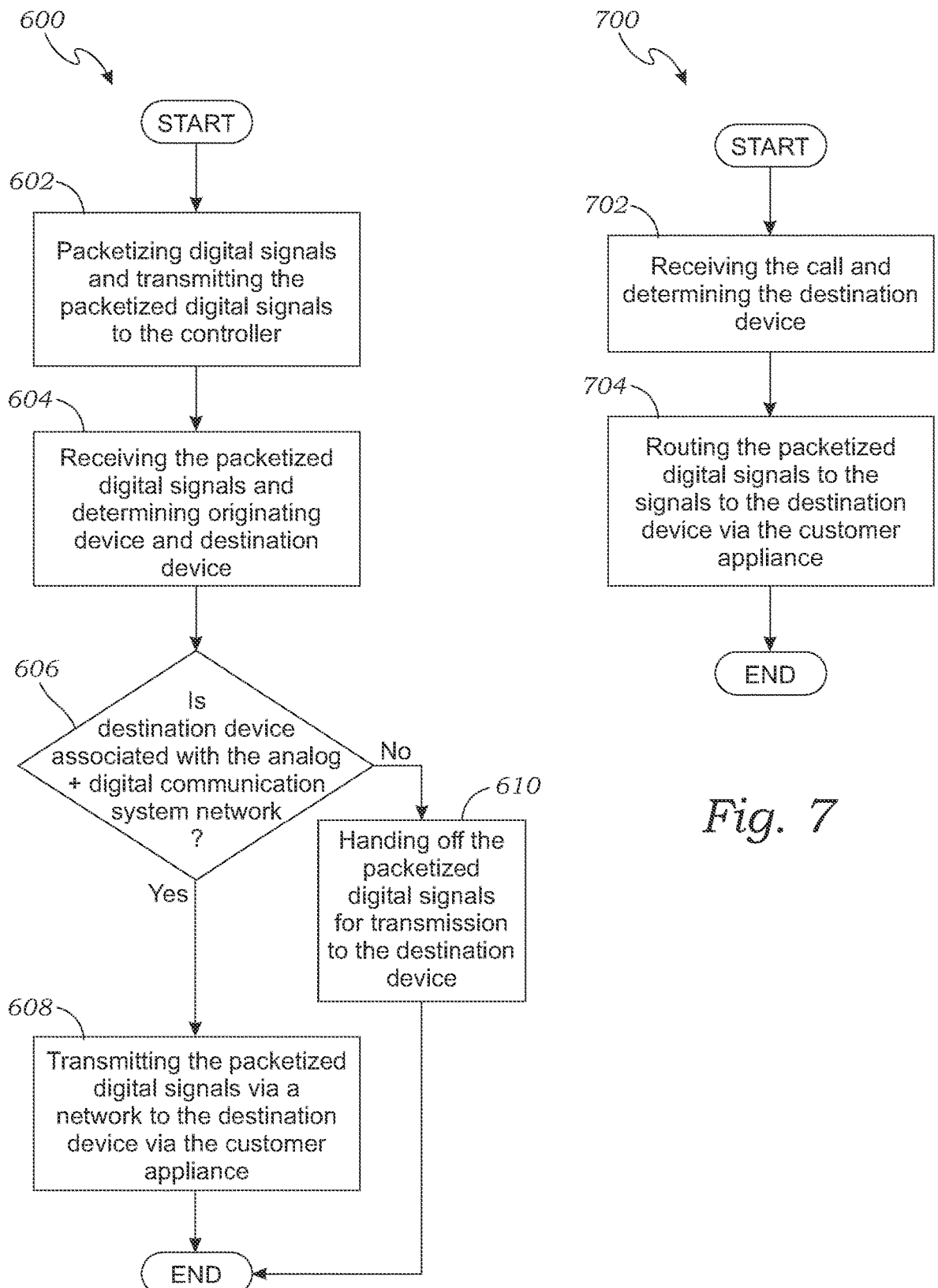
FIG. 6 is a is a flowchart of a method of routing an outgoing call from a device associated with a customer appliance to a destination device, in accordance with an implementation of the present disclosure.
FIG. 7 is a flowchart of a method of routing an incoming call from a destination device to a device associated with a customer appliance, in accordance with an implementation of the present disclosure.

FIG. 6 is a flowchart 600 of a method of routing an outgoing call from a device associated with a customer appliance to a destination device, in accordance with an implementation of the present disclosure. For example, the first POTS device 214 may wish to place an outgoing call to a destination device, such as the first external device 216, via the customer appliance 202 in FIG. 2. In step 602, the customer appliance 202 packetizes digital signals associated with a telephone call and transmits the packetized digital signals to the controller 204. Specifically, a user operating the customer appliance 202 may pick up the first POTS device 214 and dial the telephone number (after hearing a dial tone) associated with the first external device 216. The customer appliance 202 may receive the analog signal from the first POTS device 214 and convert the analog signal to a packetized digital signal via the analog-to-digital converter 324, as described above. The customer appliance 202 may then transmit packetized digital signal to the controller 204.

In step 604, the controller 204 receives the packetized digital signals and determines which device is the originating device which placed/originated the call and which device is the destination device where the call is to be routed to and terminated. For example, the controller 204 receives the packetized digital signals which are encrypted. The controller 204 decrypts the signals and identifies a unique identifier associated with the device that originated the call (i.e., the first POTS device 214 associated with the customer appliance 202). Or, alternatively, the unique identifier may identify the customer appliance 202. The controller 204 may use one of the databases described above to determine that a device associated with the customer appliance 202 is the device that originated the call. In another implementation, the controller 204 may not determine information regarding the originating device.

After the signals are decrypted, the controller 204 can determine the phone number of the destination device. For example, the packetized digital signals may include a packet header which contains a phone number of the first external device 216 which is the destination device. In other implementations, the destination device may not be an external device but may instead be a device associated with a second customer appliance 212, a third customer appliance 220, or another device within the analog and digital communication system 230.

In decision box 606, the controller 204 determines whether the destination device is associated with the analog and digital communication system 230. For example, the controller 204 may review a packet header to determine whether the phone number of the destination device is one that is associated with a customer appliance within the analog and digital communication system 230 or not. The controller 204 may determine that the destination device is internal if the controller 204 determines the destination device is discovered to be internal to the analog and digital communication system 230 and thus connected to a customer appliance as a result of checking one or more databases. The controller 204 ensures various QoS checks as described above.

If the destination device is associated with the analog and digital communication system 230 and the decision box 606 returns yes, the method proceeds to step 608. In step 608, the controller 204 transmits the packetized digital signals via a network as the Internet to the destination device via the customer appliance. For example, the packetized digital signals are transmitted via the first network 224 (or the second network 232, or another network) to the destination device, the first POTS device 214, via customer appliance 202. The call is then connected and the method ends.

Otherwise, if the destination device is not associated with the analog and digital communication system 230 and the decision box 606 returns no, the method proceeds to step 610. In step 610, the controller 204 hands off the packetized digital signals for transmission to the destination device. The controller 204 may hand off the packetized digital signals to a Mobile Telephone Switching Office (MTSO) if the destination device is a mobile device or a PSTN central office if the destination device is a POTS device.

The call is then connected and the method ends.

As described above, the controller 204 allows routing of multiple calls occurring at the same time. Therefore, the controller 204 may perform the steps of flowchart 600 for multiple calls.

FIG. 7 is a flowchart 700 of a method of routing an incoming call from a destination device to a device associated with a customer appliance, in accordance with an implementation of the present disclosure. For example, the first POTS device 214 associated with the customer appliance 202 in FIG. 2 may be a destination device that is the recipient of an incoming originated by the first external device 216 or second customer appliance 212. In this scenario, the device that is the destination device (e.g., the first POTS device 214 associated with the customer appliance 202) is where the call terminates. A user employing the first external device 216 or second customer appliance 212 may place a telephone call by dialling the number of the first POTS device 214 associated with the customer appliance 202.

In step 702, the controller 204 receives the call from the originating device and determines which device is the originating device which placed/originated the call and which device is the destination device where the call is to be routed to and terminated at. The call may be in the form of analog and/or digital signals. If the call is in the form of analog signals, the controller 204 converts the analog signals into packetized digital signals.

In one example, the controller 204 may determine that the call is not originated by a device (or a device associated with a customer appliance) within the analog and digital communication system 230 (i.e., by checking the originating call's telephone number against one or more databases and not finding a match). Thus, an assumption may be made that the originating device is external to the analog and digital communication system 230. The controller then determines that the destination number belongs to the first POTS device 214 associated with the customer appliance 202 or simply that it is associated with the customer appliance 202. Such determination may be made by checking one of the databases.

In another implementation not depicted in method of FIG. 7, the controller 204 may determine the identity of the originating device as being within the analog and digital communication system 230 (e.g., by finding a match linking the originating phone number to the originating device in one or more databases), as described in FIG. 6.

The controller 204 packetizes and digitizes the received signals as needed into packetized digital signals and ensures various QoS checks as described above.

In step 704, the controller 204 routes the packetized digital signals to the destination device via the customer appliance. For example, the controller 204 determines that the destination device is internal (e.g., if the controller 204 determines the destination device is discovered to be internal and thus connected to a customer appliance as a result of checking one or more databases) and identifies the device (e.g., the first POTS device 214) as being associated with a customer appliance (e.g., the customer appliance 202), then the packetized digital signals are transmitted via a network such as the Internet. Otherwise, the controller 204 may identify the destination device as simply being the customer appliance 202 and the customer appliance may then route the call to the first POTS device 214 accordingly.

In an implementation, all telephone numbers associated with one or more customer appliances are stored in one or more databases connected to the controller 204. Therefore, any incoming call that is to be terminated at a device associated with a customer appliance is received by the controller 204.

The call is then connected, and the method ends.

The analog and digital communication system provides many benefits over existing systems. For example, the analog and digital communication system acts like a central office in a box. This allows support and interfacing of POTS devices with a network in an easy, reliable and inexpensive manner when compared to existing solutions.

Furthermore, the analog and digital communication system uses a signaling protocol with virtually none or zero data overhead to connect. The analog and digital communication system encapsulates voice packets to the public switch telephone network (PSTN) with end-to-end encryption to provide secure transfer the telephone call signals. The analog and digital communication system offers multi-wide area network, LTE and bonding.

The analog and digital communication system also allows for a dial tone and two T1/Primary Rate interface (PRI) voice handoff.

The analog and digital communication system's signaling protocol allows the POTS over Long Term Evolution (PoLTE) to hand off truly a 48 volt tip and ring hand off for uses of Life Safety calls, and voice and data connections with built-in battery.

The analog and digital communication system enables unique methods of delivering voice and data services, including Life Safety calls. Using a built-in class 3 and class 5 software switch (softswitch) technology, the analog and digital communication system allows all voice and data signalling to take place on a user premise while providing interfacing of POTS devices over Internet protocol connections via a network.

Figure 8:
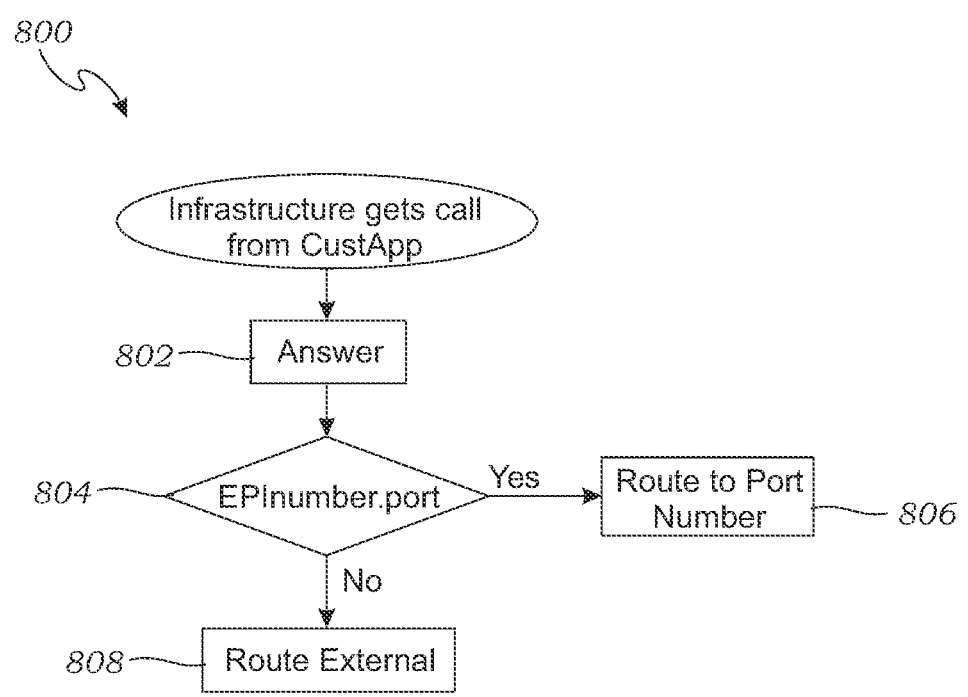
FIG. 8 is a flowchart of method of routing a packet to a device associated with a customer appliance, in accordance with an implementation of the present disclosure.

In the analog and digital communication system, packets are routed between devices during a call instead of a closed circuit being established between the devices. FIG. 8 is a flowchart 800 of method of routing a packet to between devices associated with customer appliances, in accordance with an implementation of the present disclosure.

In step 802, in response to the analog and digital communication system receiving a call from a first device associated with a first customer appliance, where the call is made to a second device associated with the second customer appliance, a controller in the system answers the call and the method proceeds to decision box 804. For example, referring to FIG. 2, the first POTS device 214 associated with the customer appliance 202 makes a call to the second POTS device 228 associated with the second customer appliance 212. The intercommunication system 200 receives the incoming call from the first POTS device 214 and the controller 204 answers the incoming call.

Referring back to FIG. 8, the decision box 804 determines whether to or not the call is contained in formatted packets. If the call is to be routed within the analog and digital communication system and thus is in a format of a digital signal and the packets are formatted packets, the packets are routed according to a port number assigned to the destination device and the method ends. In an example, suppose that the call is for a device associated with a customer appliance that is already contained in formatted packets and the decision box 804 yields a "yes", in step 806, packets are routed according to a port number assigned to the device associated with the customer appliance. Then, the method ends.

If the decision box 804 yields a "no", in step 808, the call is to be routed outside the analog and digital communication system. In such an example, the call is in a format of an analog signal. Therefore, the analog signal has to be converted to a packetized digital signal and formatted according to the analog and digital communication system protocol before the call is routed. The method then ends.

Figure 9:
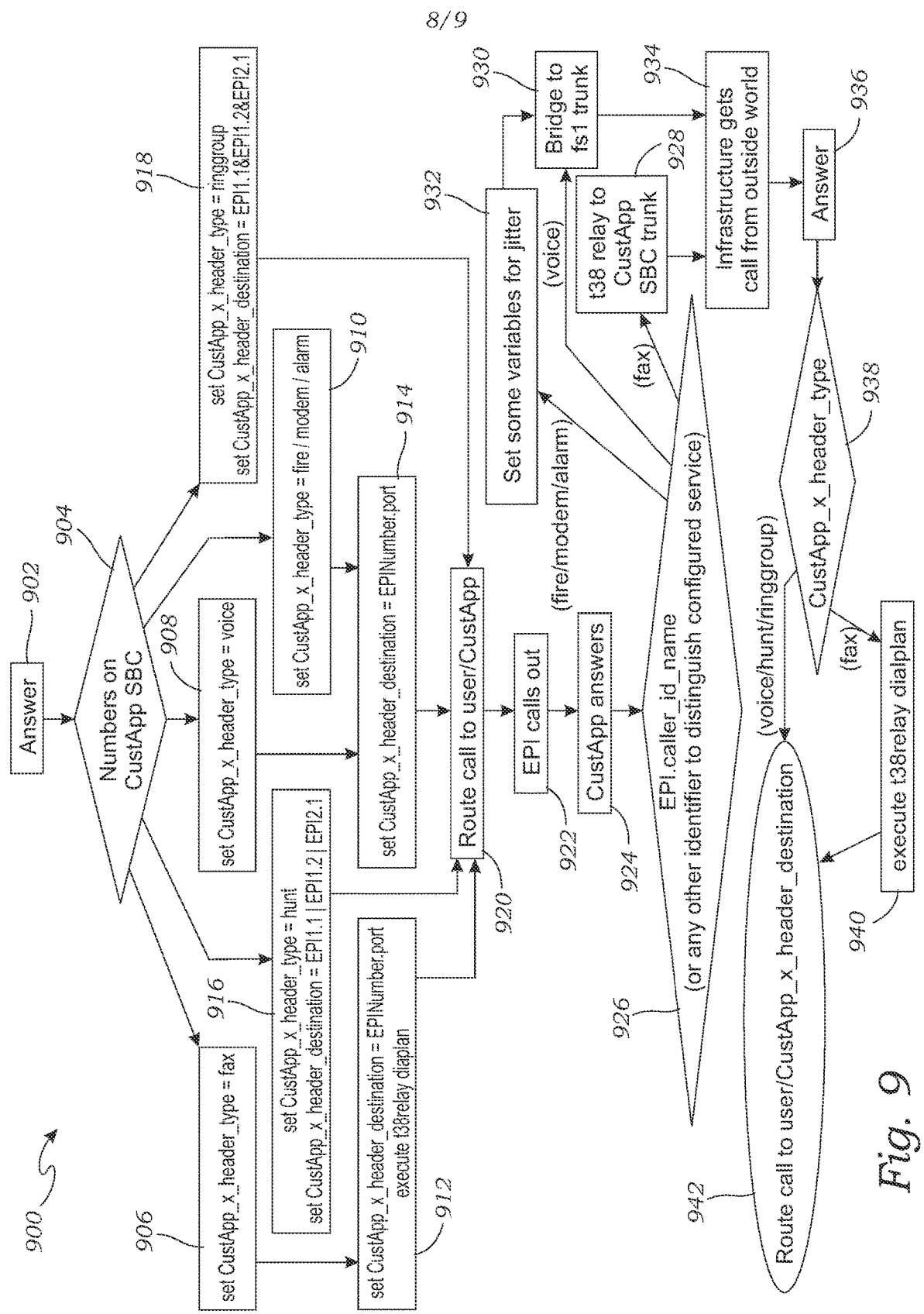
FIG. 9 is a flowchart of method of routing a packet between a first device and a second device, in accordance with an implementation of the present disclosure.

FIG. 9 is a flowchart 900 of method of routing a packet between a first device associated with a customer appliance and a second device outside of the analog and digital communication system, in accordance with an implementation of the present disclosure. A dial plan is generated by the network for a port number assigned to a device associated with a customer appliance based on a configuration of the customer appliance. A dial plan is a named set of normalization rules that translate phone numbers that are dialled by an individual user into an alternate format for purposes of call authorization and call routing.

In step 902, in response to the analog and digital communication system receiving a call from a second device outside the analog and digital communication system to a first device associated with a customer appliance, a controller in the system answers the call and the method proceeds to decision box 904.

For example, referring to FIG. 2, the first external device 216 makes a call to the first POTS device 214 associated with the customer appliance 202. The intercommunication system 200 receives the incoming call from the first external device 216 and the controller 204 answers the incoming call.

Referring again to FIG. 9, in decision box 904, a type of a device associated with the customer appliance is determined based on a dial/telephone number of the first device associated with the customer appliance. The controller may make such a determination. If the number is associated with a fax machine, the method proceeds to step 906. In step 906, the packet header type is set to fax and the method proceeds to step 914.

If in decision box 904, it is determined that the number is associated with a voice call, in step 908, the packet header type is set to voice, and the method proceeds to step 914. In step 914, the packet header destination is set to a port number associated with the first device and t38 relay dial plan is executed. Then, the method proceeds to step 920.

If in decision box 904, it is determined that the number is associated with any of a fire, modem, or alarm machine, the method proceeds to step 910. In step 910, the packet header type is set to either fire, modem, or alarm, and the method proceeds to step 914. Then, method proceeds to step 920.

If in decision box 904, it is determined that the number is associated with a hunt, the method proceeds to step 916. In step 916, the packet header type is set to hunt and packet header destination is set to logical OR of fire, modem, and alarm. Then, the method proceeds to step 920.

If in decision box 904, it is determined that the number is associated with a ring group, the method proceeds to step 918. In step 918, the packet header type is set to hunt and packet header destination is set to logical AND of fire, modem, and alarm. Then, the method proceeds to step 920.

In step 920, packets are routed to the customer appliance and the method proceeds step 922. In step 922, EPI is called out and the method proceeds to step 924. In step 924, the customer appliance answers the call and the method proceeds to decision box 926. In the decision box 926, a configured service of the first device is determined based on an identifier such as caller IDs and/or names. If the configured service is determined to be a fax, the method proceeds to step 928. In step 928 t38 relay is executed to SBC trunk and the method proceeds to step 934. If the configured service is determined to be voice, the method proceeds to step 930. In step 930, bridge is executed to fs1 trunk and the method proceeds to step 934. If the configured service is determined to be a fire, a modem, or alarm, the method proceeds to step 932. In step 932 some variables are set for jitter and the method proceeds to step 934. Then, the method proceeds to step 936. In step 934, the customer appliance receives the packets and the method proceeds to step 936. In step 936, the customer appliance answers the call from the second device outside of the system. Then, the method proceeds to decision box 938.

In decision box 938, the final routing destination is determined based on the packet header type. If the packet header type is fax, the method proceeds step 940. In step 940, t38 relay dial plan is executed, then the method proceeds to step 942. If the packet header type is voice, hunt, or ring group, the method proceeds to step 942. In step 924, packetized digital signal is an analog signal and routed to the first device. Then method ends.

Figure 10:
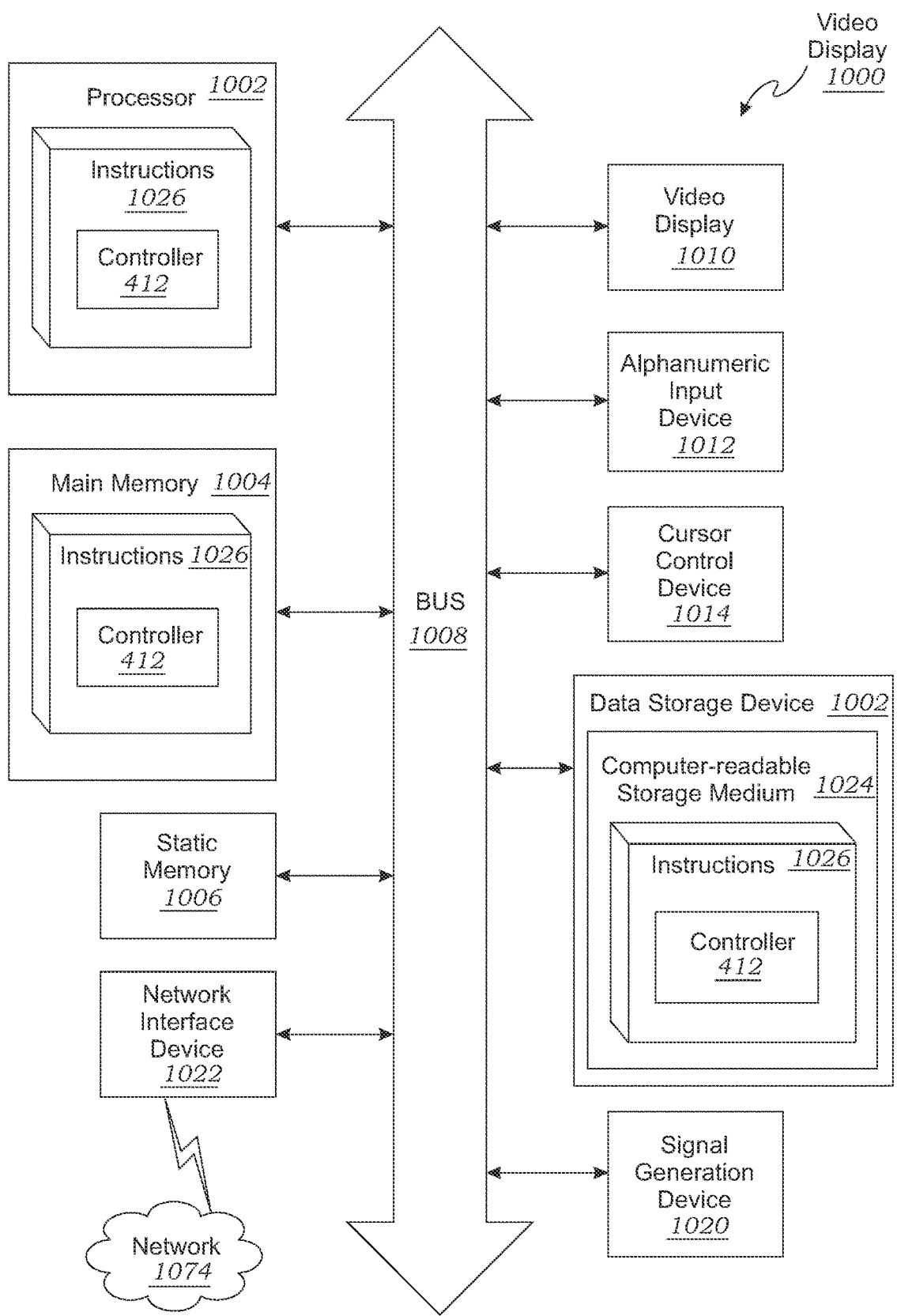
FIG. 10 is a block diagram illustrating an exemplary computer device operating in accordance with an implementation of the present disclosure.

FIG. 10 is a block diagram of an illustrative computing device operating in accordance with the examples of the present disclosure. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specifies actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1000 includes a processing device 1002, a main memory 1004 (e.g., read-only memory (ROM), flash memory, dynamic random access memory (DRAM) (such as synchronous DRAM (SDRAM) or RDRAM, etc.), a static memory 1006 (e.g., flash memory, static random access memory (SRAM), etc.), and a data storage device 1018, which communicate with each other via a bus 1008.

Processing device 1002 represents one or more general-purpose processing devices such as a microprocessor, central processing unit, or the like. More particularly, the processing device may be a complex instruction set computing (CISC) microprocessor, reduced instruction set computer (RISC) microprocessor, very long instruction word (VLIW) microprocessor, a processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 is configured to execute the instructions 1026 for performing the operations and steps discussed herein.

In accordance with one or more aspects of the present disclosure, processing device 1002 may be configured to execute the first controller 412 implementing method steps 604, 608, and 610, decision box 606, flowchart 700, flowchart 800 and flowchart 900 (or any combinations) for providing telephone call routing.

The computer system 1000 may further include a network interface device 1022 communicably coupled to a network 1074. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1020 (e.g., a speaker).

The data storage device 1018 may include a non-transitory computer-readable storage medium 1024 on which is stored instructions 1026 embodying any one or more of the methodologies of functions described herein. The instructions 1026 may also reside, completely or at least partially, within the main memory 1004 as instructions 1026 and/or within the processing device 1002 as instructions 1026 during execution thereof by the computer system 1000; the main memory 1004 and the processing device 1002 also constituting machine-accessible storage media.

In accordance with one or more aspects of the present disclosure, instructions 1026 may comprise executable instructions encoding various functions of implementing method steps 604, 608, and 610, decision box 606, flowchart 700, flowchart 800, and flowchart 900 (or any combinations) for providing telephone call routing.

The non-transitory computer-readable storage medium 1024 may also be used to store instructions 1026 to implement any one or more of the methodologies of functions described herein in an analog and digital communication system such as the system described with respect to FIGS. 5, 6, 7, 8 and/or 9, and/or a software library containing methods that call the above applications.

While the non-transitory computer-readable storage medium 1024 is shown in an example implementation to be a single medium, the term "non-transitory computer-readable storage medium" should be taken to include a single medium or multiple media (e.g., a centralized or distributed database, and/or associated caches and servers) that store the one or more sets of instructions. The term "non-transitory computer-readable storage medium" shall also be taken to include any medium that is capable of storing, encoding or carrying a set of instruction for execution by the machine and that cause the machine to perform any one or more of the methodologies of the disclosure. The term "non-transitory computer-readable storage medium" shall accordingly be taken to include, but not be limited to, solid-state memories, and optical and magnetic media.

In the foregoing description, numerous details are set forth. It may be apparent, however, that the disclosure may be practiced without these specific details. In some instances, well-known structures and devices are shown in block diagram form, rather than in detail, in order to avoid obscuring the disclosure.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a machine-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The disclosure may be provided as a computer program product, or software, that may include a machine-readable storage medium having stored thereon instructions, which may be used to program a computer system (or other electronic devices) to perform a process according to the disclosure. A machine-readable storage medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

For purposes of this disclosure, any element mentioned in the singular also includes the plural.

Although some figures depict lines with arrows to represent intra-network or inter-network communication, in other implementations, additional arrows may be included to represent communication. Therefore, the arrows depicted by the figures do not limit the disclosure to one-directional or bi-directional communication.

As used in this application, the words "a," "an," and "one" are defined to include one or more of the referenced items unless specifically stated otherwise. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application.

Although terminology such as first, second, etc., is used herein, these terms do not specify a chronological order.

What is claimed is:

1. An analog and digital communication system for establishing a connection between a plain old telephone service (POTS) device and a destination device, the analog and digital communication system comprising:
   a customer appliance comprising:
      at least one port operably connected to the POTS device;
      an electronic control unit comprising a built-in softswitch to facilitate dialing for the POTS device;
      an analog to digital converter for converting analog and digital signals transmitted between the POTS device and the destination device; and
      a processing device, operatively coupled to a memory, to execute instructions, the processing device to packetize and depacketize the digital signals associated with a telephone call between the POTS device and the destination device; and
   a datacenter controller communicating remotely with the customer appliance via an encrypted connection to provide routing of the telephone call between the POTS device and the destination device;
   wherein the datacenter controller is configured to: (i) at least one of transmit the telephone call or receive the telephone call via a closest public switched telephone network (PSTN) handoff and (ii) facilitate a best quality of the telephone call to ensure a quality of service (QoS).

2. The analog and digital communication system of claim 1, further comprising a remote storage in communication with the datacenter controller, the remote storage comprising a database of a plurality of customer appliances.

3. The analog and digital communication system of claim 1, wherein the customer appliance further comprises a modem.

4. The analog and digital communication system of claim 1, wherein the customer appliance further comprises an access point providing a wide area network (WAN).

5. The analog and digital communication system of claim 1, wherein the customer appliance provides an end-to-end encryption of the telephone call.

6. The analog and digital communication system of claim 1, wherein the at least one port comprises multiple ports and the customer appliance is operably connected to a T1 line via a given port of the multiple ports.

7. The analog and digital communication system of claim 1, wherein the customer appliance provides notification of the telephone call to a user via a text message or an email.

8. The analog and digital communication system of claim 1, wherein the customer appliance further comprises a voice gateway.

9. The analog and digital communication system of claim 1, wherein the encrypted connection provides a variable bit rate of the digital signals, wherein the variable bit rate is determined in view of network connectivity or bandwidth.

10. The analog and digital communication system of claim 1, wherein the customer appliance further comprises a 66 block.

11. The analog and digital communication system of claim 1, wherein the datacenter controller remotely connects with a second customer appliance.

12. The analog and digital communication system of claim 1, wherein the at least one port comprises a plurality of ports and a given port of the plurality of ports is operably connected to a second POTS device, wherein the datacenter controller facilitates routing of calls between the POTS device and the second POTS device operably connected to the customer appliance.

13. The analog and digital communication system of claim 1, wherein the encrypted connection comprises a bidirectional encrypted tunnel.

14. The analog and digital communication system of claim 1, wherein the processing device is further configured to:
determine a type of a signal associated with the POTS device; and
modify a header associated with the signal to indicate the type determined.

15. The analog and digital communication system of claim 14, wherein the datacenter controller is further configured to:
route the signal associated with the POTS device based on the type indicated by the modified header.

16. The analog and digital communication system of claim 1, wherein the datacenter controller is further configured to:
register the customer appliance.

17. The analog and digital communication system of claim 1, wherein the processing device is further configured to:
register the POTS device.

18. The analog and digital communication system of claim 1, wherein the built-in softswitch implements a class 3 switch and a class 5 switch.

19. An analog and digital communication system for establishing a connection between a plain old telephone service (POTS) device and a destination device, the analog and digital communication system comprising:
a first customer appliance and a second customer appliance, wherein each of the first customer appliance and the second customer appliance comprises:
at least one port operably connected to the POTS device;
an electronic control unit comprising a built-in softswitch to facilitate dialing for the POTS device;
an analog to digital converter for converting analog and digital signals transmitted between the POTS device and the destination device; and
a processing device, operatively coupled to a memory, to execute instructions, the processing device to packetize and depacketize the digital signals associated with a telephone call between the POTS device and the destination device; and
a datacenter controller communicating remotely with the first customer appliance and the second customer appliance via an encrypted connection to provide routing of the telephone call between the POTS device operably coupled to the first customer appliance and the destination device operably coupled to the second customer appliance;
wherein the datacenter controller is configured to: (i) at least one of transmit the telephone call or receive the telephone call via an internal customer appliance network establishing a connection between the first customer appliance and the second customer appliance and (ii) facilitate a best quality of the telephone call to ensure a quality of service (QoS).

20. The analog and digital communication system of claim 19, further comprising a remote storage in communication with the datacenter controller, the remote storage comprising a database of a plurality of customer appliances.

21. The analog and digital communication system of claim 19, wherein the first customer appliance provides an end-to-end encryption of the telephone call.

22. The analog and digital communication system of claim 19, wherein the encrypted connection comprises a bidirectional encrypted tunnel.

* * * * *